US005777177A

United States Patent [19]
Pazos

[11] Patent Number: 5,777,177
[45] Date of Patent: Jul. 7, 1998

[54] PREPARATION OF DOUBLE METAL CYANIDE-CATALYZED POLYOLS BY CONTINUOUS ADDITION OF STARTER

[75] Inventor: José F. Pazos, Havertown, Pa.

[73] Assignee: Arco Chemical Technology, L.P., Greenville, Del.

[21] Appl. No.: 597,781

[22] Filed: Feb. 7, 1996

[51] Int. Cl.[6] ................................................ C07C 41/03
[52] U.S. Cl. ........................ 568/679; 502/175; 562/572
[58] Field of Search ........................ 568/476, 479, 568/679; 562/537; 502/305, 316, 317, 321, 175

[56] References Cited

U.S. PATENT DOCUMENTS

| | | | |
|---|---|---|---|
| 3,404,109 | 10/1968 | Milgrom | 260/611 |
| 3,427,334 | 2/1969 | Herold | 260/429 |
| 3,538,043 | 11/1970 | Herold | 260/40 |
| 3,900,518 | 8/1975 | Milgrom | 260/573 |
| 3,941,849 | 3/1976 | Herold | 260/607 |
| 4,472,560 | 9/1984 | Kuyper et al. | 526/120 |
| 4,477,589 | 10/1984 | Van Der Hulst et al. | 502/169 |
| 5,114,619 | 5/1992 | Heuvelsland | 252/182.27 |
| 5,145,883 | 9/1992 | Saito et al. | 521/172 |
| 5,158,922 | 10/1992 | Hinney et al. | 502/175 |
| 5,470,813 | 11/1995 | Le-Khac | 502/175 |
| 5,482,908 | 1/1996 | Le-Khac | 502/156 |

*Primary Examiner*—Gary Geist
*Assistant Examiner*—Sreeni Padmanabhan
*Attorney, Agent, or Firm*—Jonathan L. Schuchardt

[57] ABSTRACT

Double metal cyanide-catalyzed polyols are made by an improved process in which a starter is continuously added during polymerization of the epoxide. The process includes a continuously added starter ($S_c$), and optionally, an initially charged starter ($S_i$). The continuously added starter comprises at least about 2 equivalent percent of the total starter used. The process enables the use of water and low molecular weight polyol starters in DMC-catalyzed polyol synthesis. In addition, the process gives polyether polyols having reduced levels of high molecular weight polyol tail, which can adversely affect polyurethane foam processing.

19 Claims, 5 Drawing Sheets

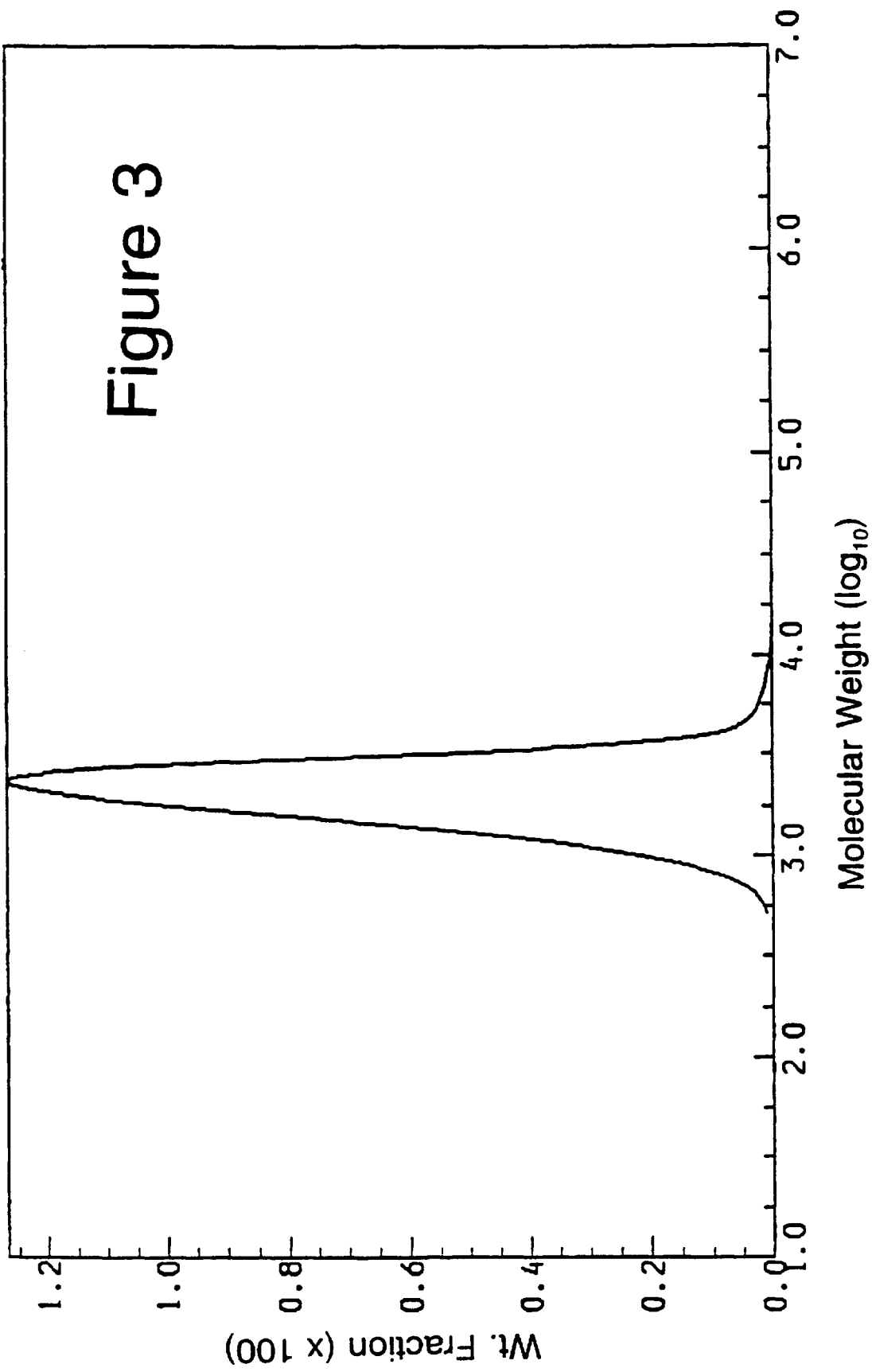

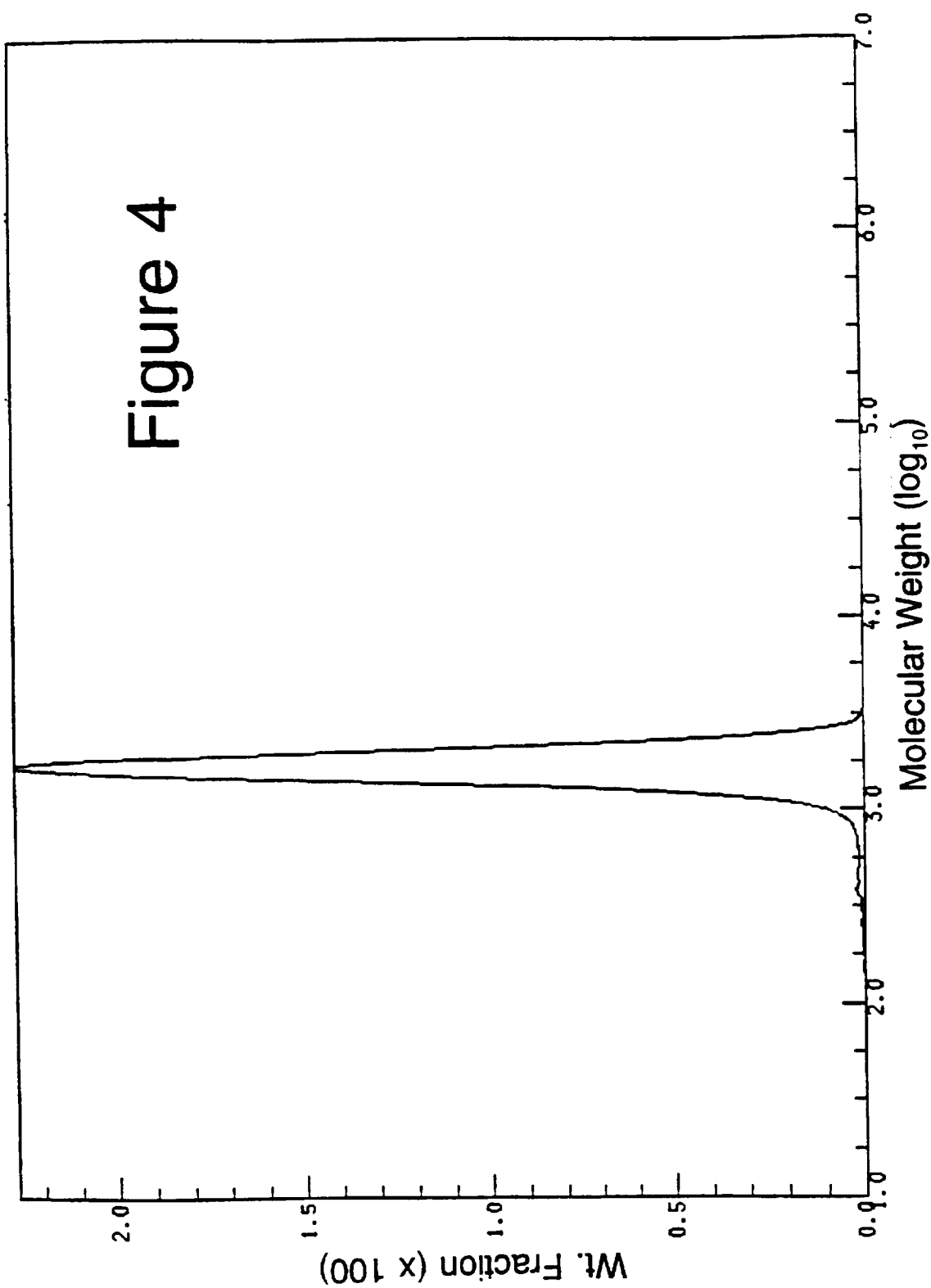

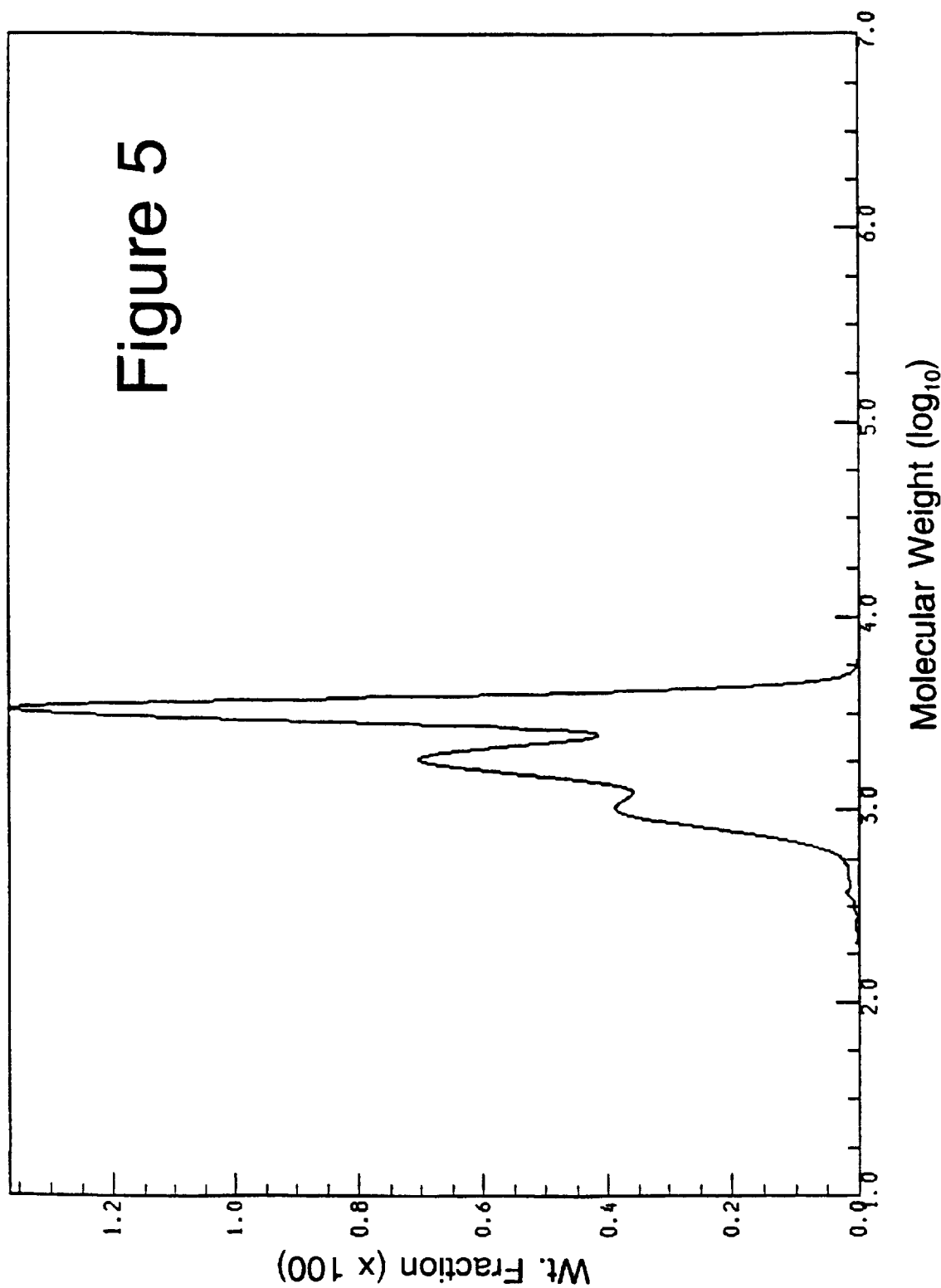

PREPARATION OF DOUBLE METAL CYANIDE-CATALYZED POLYOLS BY CONTINUOUS ADDITION OF STARTER

FIELD OF THE INVENTION

The invention relates to a process for preparing polyether polyols, which are useful for making polyurethane foams, elastomers, sealants, coatings, and adhesives. In particular, the invention is a polyol preparation process that uses a double metal cyanide (DMC) catalyst. The process uniquely allows the use of water or a low molecular weight polyol as a starter for the polymerization, and gives polyols that have a reduced content of high molecular weight polyol tail.

BACKGROUND OF THE INVENTION

Double metal cyanide (DMC) complexes are highly active catalysts for preparing polyether polyols by epoxide polymerization. The catalysts enable the preparation of polyether polyols having narrow molecular weight distributions and very low unsaturation (low mono content) even at high molecular weights. Recent improvements have resulted in DMC catalysts that have exceptional activity. See, for example, U.S. Pat. No. 5,470,813.

While DMC catalysts have been known since the 1960s, commercialization of polyols made from these catalysts is a recent phenomenon, and most commercial polyether polyols are still produced with potassium hydroxide. One reason for the delayed commercial availability of DMC polyols is that conventional polyol starters, e.g., water, propylene glycol, glycerin, trimethylolpropane, and the like, initiate DMC-catalyzed epoxide polymerizations sluggishly (if at all), particularly in the typical batch polyol preparation process. Typically, the polyol starter and DMC catalyst are charged to a reactor and heated with a small amount of epoxide, the catalyst becomes active, and the remaining epoxide is added continuously to the reactor to complete the polymerization.

In a typical batch process for making polyols using either KOH or a DMC catalyst, all of the polyol starter is charged initially to the reactor. When KOH is used as the catalyst, it is well understood by those skilled in the art that continuous addition of the starter (usually a low molecular weight polyol such as glycerin or propylene glycol) with the epoxide will produce polyols having broader molecular weight distributions compared with products made by charging all of the starter initially. This is true because the rate of alkoxylation with KOH is substantially independent of polyol molecular weight. If low molecular weight species are constantly being introduced, the molecular weight distribution will broaden.

Generally, polyols having broad molecular weight distributions are undesirable because they have relatively high viscosities, which can adversely impact processability in polyurethane formulations, particularly when prepolymers are made from the polyols. In addition, polyols with narrow molecular weight distributions generally give polyurethanes with better physical properties.

Those skilled in the art have assumed that continuous addition of a starter in a DMC-catalyzed polyol synthesis would also produce polyols having relatively broad molecular weight distributions. Consequently, the DMC polyol synthesis art teaches almost exclusively to charge all of the starter to the reactor initially, and to add the epoxide continuously during the polymerization.

One exception is U.S. Pat. No. 3,404,109 (Milgrom). Milgrom teaches a small-scale process for making a polyether diol using a DMC catalyst and water as a starter. Milgrom teaches to charge a beverage bottle with DMC catalyst, all of the epoxide to be used, and water, and to heat the capped bottle and contents to polymerize the epoxide. Milgrom teaches (column 7) that "[w]hen large amounts of water are employed to yield low molecular weight telomers, it is preferred to add the water incrementally because large amounts of water decrease the rate of telomerization." Incremental addition of the starter (water) is used to give a "practical" rate of reaction. Thus, Milgrom charges all of the epoxide to the reactor initially, but adds the starter incrementally.

Interestingly, Milgrom also teaches that incremental addition of water "can also be employed to give telomers of a broader molecular weight distribution than those possible where all of the water is added at the beginning of the reaction." In other words, the result expected from a DMC-catalyzed process is the same as the result obtained with a KOH-catalyzed process: continuous or incremental addition of starter should give polyols with broad molecular weight distributions. Thus, a skilled person understands from Milgrom that incremental addition of a starter to a DMC-catalyzed epoxide polymerization will produce polyols having a broader molecular weight distributions than would be obtained if all of the starter were charged initially.

Heuvelsland (U.S. Pat. No. 5,114,619) teaches a process for making polyether polyols that involves continuous addition of water and epoxide to a reaction mixture containing a barium or strontium oxide or hydroxide catalyst. A DMC-catalyzed process is not disclosed. Heuvelsland's process produces polyols with reduced unsaturation. The impact of continuous water addition in the presence of barium or strontium catalysts on polyol molecular weight distribution is not discussed. Heuvelsland notes that, unlike water, continuous addition of low molecular weight diols, triols, and polyoxyalkylene glycols does not reduce polyol unsaturation. In addition, substitution of KOH for the barium or strontium catalyst does not yield the improvement.

Because conventional polyol starters initiate so slowly with DMC catalysts, polyol starters of higher molecular weight (e.g., 400–700 mol. wt. propoxylated glycerin) are commonly used. These higher molecular weight polyol starters are preferably eliminated because they must be synthesized separately (e.g., from glycerin, propylene oxide, and KOH) using a dedicated reactor. In addition, the KOH catalyst must be removed from a starter polyol before it is used as an initiator for a DMC-catalyzed polyol preparation because even traces of basic substances often deactivate DMC catalysts. Thus, a conventional KOH polyol unit having refining capability is needed just to make a starter polyol that can be used productively with a DMC catalyst. A process that allows a DMC catalyst to be used with a conventional starter such as propylene glycol or glycerin would be valuable.

The unusually high reactivity of DMC catalysts presents another challenge to polyol manufacturers: reactor fouling. Sticky polyol gels tend to form in reactors using DMC catalysts, and these gels tend to accumulate over time, fouling the reactor and eventually forcing a shutdown. The gels, which are not observed in a conventional KOH-catalyzed polyol synthesis, are preferably eliminated.

One consequence of charging all of the starter initially as in a typical batch polyether polyol synthesis is that reactors must often be used inefficiently. For example, to make a 4000 mol. wt. polyoxypropylene diol (4K diol) from a 2000 mol. wt. polyoxypropylene diol (2K diol) "starter," the reactor is almost half full at the start of the reaction; to make 50 gallons of product, we would start with 25 gallons of 2K diol starter. A valuable process would overcome such "build ratio" limitations, and would permit efficient use of reactors regardless of the molecular weight of the starter or the product sought. For example, it would be valuable to have the option to charge our 50 gallon reactor with only 5 gallons of 2K diol starter, and still make 50 gallons of 4K diol product.

In addition to the process challenges of DMC catalysis, commercial acceptance of DMC-catalyzed polyols has been hindered by the variability of polyol processing and performance, particularly in the production of flexible and molded polyurethane foams. DMC-catalyzed polyols usually cannot be "dropped into" foam formulations designed for KOH-catalyzed polyols because the polyols do not process equivalently. DMC-catalyzed polyols often give too much or too little foam stability. Batch-to-batch variability in the polyols makes foam formulation unpredictable. The cause of this unpredictability in foam formulation with DMC-catalyzed polyols has not been well understood, and consistent results have remained elusive.

An improved process for making DMC-catalyzed polyols is needed. Particularly needed is a process that eliminates the need to separately synthesize a polyol starter by KOH catalysis, and enables the use of simple starters such as water, propylene glycol, and glycerin. A valuable process would eliminate the problem of reactor fouling by polyol gels, would make efficient use of reactors, and would overcome build-ratio limitations. Preferably, the process would give polyether polyols having relatively narrow molecular weight distributions, since these polyols are more easily processed and give polyurethanes with good physical properties. Also needed are polyols that process and perform more consistently in polyurethane formulations, especially flexible and molded foams.

SUMMARY OF THE INVENTION

The invention is an improved process for making double metal cyanide-catalyzed polyols. The process comprises making a polyether polyol by polymerizing an epoxide in the presence of a double metal cyanide (DMC) catalyst, a continuously added starter ($S_c$), and optionally, an initially charged starter ($S_i$). The continuously added starter comprises at least about 2 equivalent percent of the total starter used (total starter=$S_c$+$S_i$). While conventional processes for making DMC-catalyzed polyols charge all of the starter to be used to the reactor at the start of the polymerization, the process of the invention uniquely adds both the epoxide and the $S_c$ continuously to the reaction mixture during the polymerization.

The process of the invention has surprising and valuable advantages. First, unlike other DMC-catalyzed polyol preparations, the process of the invention effectively uses water or a low molecular weight polyol as a starter. Previously, these starters were generally avoided because of sluggish initiation properties. Second, because water or a low molecular weight polyol can be used as a starter, the process eliminates the need to synthesize a costly higher molecular weight polyol starter by KOH catalysis in a separate, dedicated reactor. Third, the process overcomes the problem of reactor fouling by polyol gel formation that accompanies the use of DMC catalysts. Fourth, the process of the invention makes efficient use of reactors and overcomes many build-ratio limitations. Fifth, the process of the invention unexpectedly produces polyether polyols that have narrow molecular weight distributions, which are desirable for good polyurethane physical properties. Although the prior art teaches to avoid continuous addition of starters, I surprisingly found that continuous addition of starter, in the case of a DMC-catalyzed polyol synthesis, does not give polyols with broad molecular weight distributions.

The invention includes polyether polyols made by continuously adding the epoxide and at least about 2 eq. % of the $S_c$ in a DMC-catalyzed polyol synthesis. These polyols offer surprising and valuable advantages for polyurethane formulation. In particular, the polyols contain a reduced proportion of high molecular weight tail (i.e., polyol having a number average molecular weight greater than about 100,000) compared with prior DMC-catalyzed polyols.

I surprisingly found that polyols having a reduced amount of high molecular weight tail are much easier to formulate into polyurethane systems—especially flexible and molded foams—and offer more predictable processing and performance. My results demonstrate that variability in polyurethane foam performance previously witnessed with DMC-catalyzed polyols is largely due to the presence of even small amounts of high molecular weight polyol tail. The polyols of the invention, which contain a reduced amount of high molecular weight tail compared with polyols made without continuous addition of starter, offer improved processing characteristics, give fewer problems with tight foam or foam collapse, and give flexible and molded polyurethane foams with excellent physical properties.

BRIEF DESCRIPTION OF THE DRAWINGS

FIGS. 1–5 are results of gel permeation chromatography (GPC) analyses of polyether polyol samples made by DMC-catalyzed processes of the invention using continuous addition of starter (FIGS. 1–3) or by a comparison process (FIGS. 4–5). The figures are explained more completely in Example 5, Comparative Example 6, and Example 18 below.

DETAILED DESCRIPTION OF THE INVENTION

Figure 1:
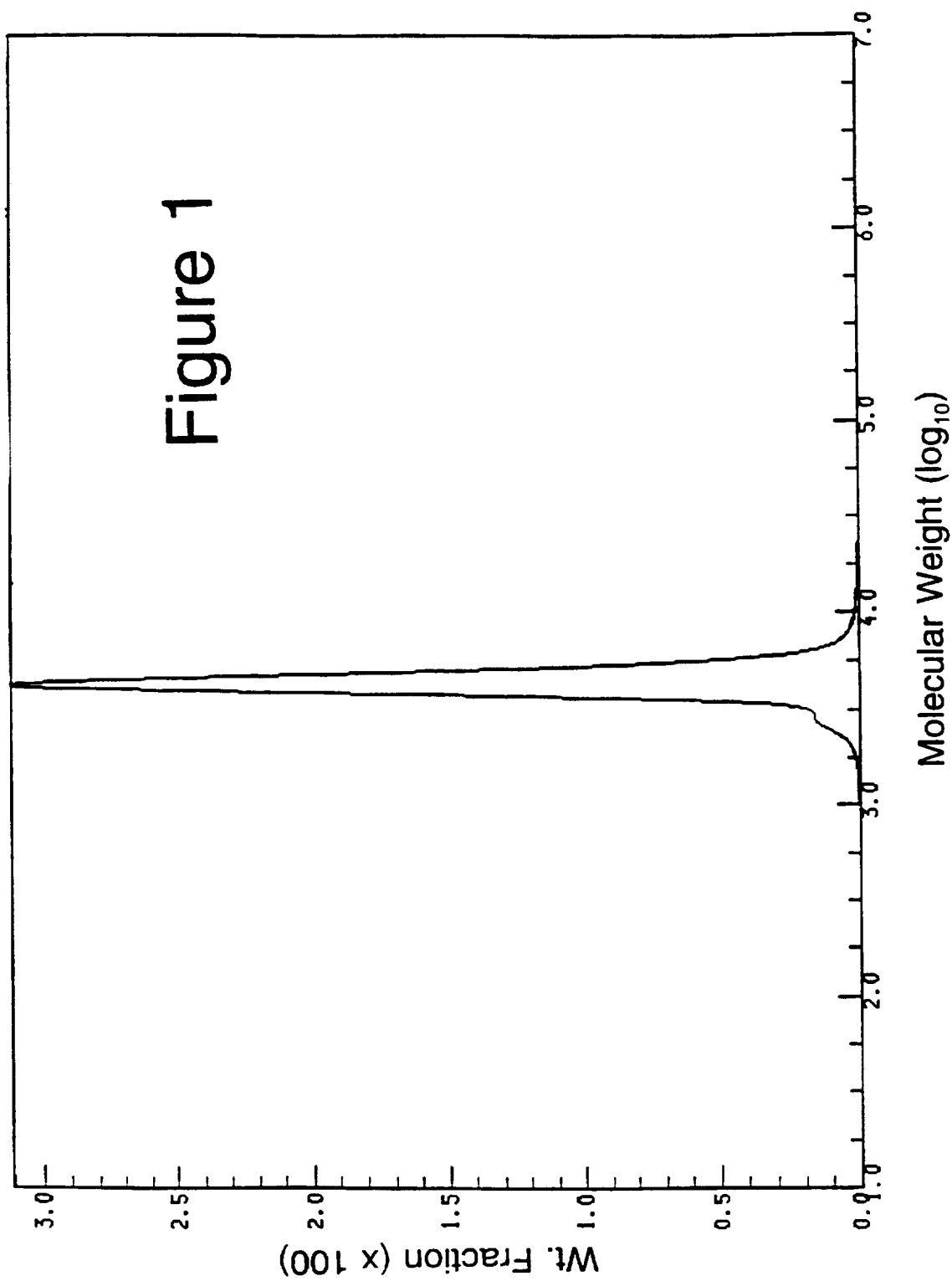

The process of the invention comprises making a polyether polyol by polymerizing an epoxide in the presence of a double metal cyanide (DMC) catalyst, a continuously added starter ($S_c$), and optionally, an initially charged starter ($S_i$).

Generally, any epoxide polymerizable using DMC catalysis can be used in the process. Preferred epoxides are ethylene oxide, propylene oxide, butylene oxides (e.g., 1,2-butylene oxide, isobutylene oxide), styrene oxide, and the like, and mixtures thereof. Polymerization of epoxides using DMC catalysts and hydroxyl-containing starters gives polyether polyols, as is well understood in the art.

Other monomers that will copolymerize with an epoxide in the presence of a DMC catalyst can be included in the process of the invention to make other types of epoxide polymers. For example, epoxides copolymerize with oxetanes (as taught in U.S. Pat. No. 3,404,109) to give polyethers, or with anhydrides to give polyesters or polyetheresters (as taught in U.S. Pat. Nos. 5,145,883 and 3,538,043).

The catalyst is a double metal cyanide (DMC) catalyst. Any DMC catalyst known in the art is suitable for use in the process. These well-known catalysts are the reaction products of a water-soluble metal salt (e.g., zinc chloride) and a water-soluble metal cyanide salt (e.g., potassium hexacyanocobaltate). Preparation of suitable DMC catalysts is described in many references, including, for example, U.S. Pat. Nos. 5,158,922, 4,477,589, 3,427,334, 3,941,849, 5,470,813, and 5,482,908, the teachings of which are incorporated herein by reference. Particularly preferred DMC catalysts are zinc hexacyanocobaltates.

The DMC catalyst includes an organic complexing agent. As the preceding references teach, the complexing agent is needed for an active catalyst. Preferred complexing agents are water-soluble heteroatom-containing organic compounds that can complex with the DMC compound. Particularly preferred complexing agents are water-soluble aliphatic alcohols. Tert-butyl alcohol is most preferred. The DMC catalyst may include, in addition to the organic complexing agent, a polyether, as is described in U.S. Pat. No. 5,482,908.

Preferred DMC catalysts for use in the process are highly active catalysts such as those described in U.S. Pat. Nos. 5,482,908 and 5,470,813. High activity allows the catalysts to be used at very low concentrations, preferably at concentrations low enough to overcome any need to remove the catalyst from the finished polyether polyol products.

The process of the invention uses a continuously added starter ($S_c$). Conventional processes for making polyols, including KOH-catalyzed and DMC-catalyzed processes, charge the catalyst and all of the starter to be used to the reactor at the start of the polymerization, and then add the epoxide continuously. In contrast, the process of the invention adds at least about 2 equivalent percent of the total starter continuously while the epoxide is added. The $S_c$ may be mixed with the epoxide, or it may be added as a separate stream.

The $S_c$ is preferably water or a low molecular weight polyol. Low molecular weight polyols as defined in this application have 1 or more hydroxyl groups and number average molecular weights less than about 300. Suitable low molecular weight polyols include, for example, glycerin, propylene glycol, dipropylene glycol, ethylene glycol, trimethylolpropane, sucrose, sorbitol, tripropylene glycol, and the like, and mixtures thereof. Preferred continuously added starters are water, propylene glycol, dipropylene glycol, glycerin, and trimethylolpropane. The $S_c$ can also be a polyol having a number average molecular weight greater than about 300 and less than the number average molecular weight of the target polyol product. The $S_c$ may comprise the entire starter component used; thus, the process of the invention can be used to make a DMC-catalyzed polyol from just a basic starter such as propylene glycol or glycerin.

The $S_c$ can also be other active hydrogen-containing compounds known as initiators for DMC-catalyzed epoxide polymerizations, including, for example, alcohols, thiols, aldehydes and ketones containing enolizable hydrogens, malonic esters, phenols, carboxylic acids and anhydrides, aromatic amines, acetylenes, and the like, and mixtures thereof. Examples of suitable active hydrogen-containing compounds appear in U.S. Pat. Nos. 3,900,518, 3,941,849, and 4,472,560, the teachings of which are incorporated herein by reference.

The amount of $S_c$ used is at least about 2 equivalent percent of the total amount of starter used. The total amount of starter ($S_t$) is the amount of continuously added starter ($S_c$) plus the amount of initially charged starter ($S_i$). Thus, $S_t = S_c + S_i$. The equivalent percent (eq. %) of continuously added starter equals $|S_c/(S_c+S_i)| \times 100$. The amount of $S_c$ used in a particular case depends on many factors, including the reactor dimensions, target molecular weight, identity of the $S_c$, reason for using the $S_c$, and other factors. For example, if the $S_c$ is being used only to eliminate high molecular weight polyol tail in an otherwise conventional DMC-catalyzed polyol process, the amount of $S_c$ needed may be small; an amount within the range of about 2 to about 10 eq. % is preferred for this purpose. Conversely, it may be desirable to add most or all of the starter as the $S_c$, particularly when elimination of a KOH-based polyol starter is desired.

The $S_c$ may be added continuously at any desired time during the polymerization. For example, pure epoxide might be added initially, followed by continuous addition of epoxide and the $S_c$. In another variation, the $S_c$ is added with the epoxide in the early stages of the polymerization, and pure epoxide is added later. Example 19 illustrates the latter approach.

The process of the invention optionally includes an initially charged starter ($S_i$), which may be the same as or different from the continuously added starter. The initially charged starter may be a "heel" from a prior polyol preparation. For example, one might make a 2000 mol. wt. polyoxypropylene diol (2K diol) by DMC catalysis, then dump 90% of the product. The remaining 10% of 2K diol "heel" could be used as the $S_i$ for preparing another batch of 2K diol (or a diol of higher molecular weight). Example 7 below illustrates a "heel" process.

Generally, the $S_i$ is a polyol that has a number average molecular weight less than or equal to that of the polyol product to be made from the $S_i$. Also, the $S_i$ generally has a hydroxyl number greater than or equal to that of the target polyol product. The $S_i$ can be a low molecular weight polyol such as glycerin or propylene glycol provided that the amount used as the $S_i$ is less than an amount sufficient to deactivate the DMC catalyst. More preferably, however, the $S_i$, when used, is a polyol of higher molecular weight, and has the nominal hydroxyl functionality of the polyol to be made. Preferred $S_i$s are polyether polyols having average hydroxyl functionalities from 1 to 8, number average molecular weights within the range of about 400 to about 30,000, and hydroxyl numbers within the range of about 560 to about 5 mg KOH/g.

When an $S_i$ is included in the process of the invention, the amount used depends on many factors, including, for example, the reactor dimensions, the identity of the $S_i$, the molecular weights of the $S_i$ and the target product, reasons for using the $S_i$, and other factors. Preferably, the amount of $S_i$, when used, is within the range of about 1 to about 98 eq. % of the total starter used. As much as 98 eq. % of $S_i$ might be used, for example, when an $S_c$ is used to eliminate high molecular weight polyol tail in an otherwise conventional DMC-catalyzed polyol preparation. On the other hand the $S_i$ can be omitted entirely or used only sparingly when the goal is to generate the polyol product principally from the continuously added starter.

The process of the invention may be performed in the presence of an inert solvent. Preferred inert solvents are aliphatic and aromatic hydrocarbons (e.g., toluene, hexanes) and ethers (e.g., tetrahydrofuran). It is often desirable to prepare an initial batch of polyol using an inert solvent, particularly when the starter consists primarily of a continuously added starter. Subsequent polyol batches can then be made using a "heel" process.

As those skilled in the art will appreciate, there are many valuable ways to use the process of the invention, each having its own advantages. The common thread in all of the process variations is continuous addition of at least 2 eq. % of starter during the epoxide polymerization. Just a few variations on the theme are illustrated below.

One way to use the process of the invention starts with a conventional process for making a polyol starter. For example, glycerin is propoxylated to produce a propoxylated glycerin polyol starter of several hundred molecular weight, and the product is refined to remove KOH residues. This polyol starter is then combined with a DMC catalyst, and activated with some propylene oxide. Additional propylene oxide containing a small proportion of water, propylene glycol, or glycerin (the $S_c$) is added to produce a polyether polyol product of several thousand molecular weight. The $S_c$ comprises from about 2 to 10 eq. % of the total starter used. The final polyether triol product contains a reduced amount of high molecular weight polyol tail (i.e., polyol having a number average molecular weight greater than about 100,000 as measured by gel permeation chromatography using a light-scattering detector) compared with polyols made without continuous addition of starter. Examples 8–10 and 12–15 below illustrate this approach.

The process described above can be used to make a product containing a mixture of polyether triol and polyether diol. Such mixtures are often valuable in formulating polyurethane products with enhanced physical properties. In this variation, the continuously added starter is a diol such as propylene glycol, or a triol/diol mixture (e.g., glycerin and propylene glycol). The final polyol product contains a desired proportion of polyether diol and triol components. Examples 12–15 illustrate the use of the process to make triol/diol mixtures.

In another process of the invention, much or all of the total starter is added continuously with the epoxide to a reaction mixture containing active DMC catalyst. This process, which overcomes the need to make a polyol starter from KOH, is illustrated in Examples 1–5. The reaction mixture initially contains just a DMC catalyst and solvent (e.g., toluene), and no $S_i$. Epoxide containing a small proportion of water or a low molecular weight polyol starter ($S_c$) is continuously added to the reaction mixture following catalyst activation. A portion of the reaction product is then used as a starter ($S_i$) for additional polymerizations. Thus, DMC-catalyzed polyols are successfully made using conventional low molecular weight polyol starters such as propylene glycol or glycerin by continuously adding them to the reaction mixture; in contrast, these starters are not used in conventional processes (in which all of the starter is charged initially) because of their tendency to deactivate DMC catalysts.

The ability to add almost any desired proportion of the starter continuously has important consequences for process efficiency. Reactor dimensions and starting materials typically limit the "build ratio" that can be used to make a particular product. Such build-ratio limitations are largely overcome by the process of the invention.

For example, suppose we want to make 100 gal. of a 4000 mol. wt. polyoxypropylene diol (4K diol) from a 2000 mol. wt. diol starter (2K diol). In a conventional process, the reactor is charged with about 50 gal. of 2K diol and DMC catalyst, and propylene oxide is added to produce 100 gal. of the 4K diol. The process efficiency is limited by the build ratio of 2 (100 gal./50 gal); half of the reactor space is needed just for the starter.

Consider how the process can be improved using continuous addition of starter: In one process of the invention, our reactor is charged with only 10 gal. of the 2K diol starter to make 100 gal. of 4K diol product (10/1 build ratio). Twenty percent (20 gal) of the final 4K diol product derives from the 2K diol starter. The remaining starter requirement is met by including 1.6 wt. % of propylene glycol in the propylene oxide feed. Thus, 80 gal of the final product is 4K diol that derives from the propylene glycol added as the $S_c$. In sum, the process of the invention provides better reactor utilization and reduces the required amount of relatively expensive 2K diol starter. The apparently inherent build-ratio limitation for making a 4K diol from a 2K diol evaporates: we pick a convenient build ratio and a diol starter (up to 4K mol. wt.), and continuously add a calculated amount of starter ($S_c$) with the epoxide to produce a 4K diol product.

The process of the invention has many advantages in addition to the process efficiency advantages described in the above illustration. First, the invention enables the use of water and low molecular weight polyol starters for DMC-catalyzed polyol synthesis. In contrast, the conventional DMC-catalyzed polyol process uses complex starters (e.g., propoxylated glycerin) to avoid problems with sluggish initiation with low molecular weight polyol starters.

Second, because water or a low molecular weight polyol can be used as a starter, the process eliminates the need to synthesize a costly higher molecular weight polyol starter by KOH catalysis in a separate, dedicated reactor. Such polyol starters require removal of KOH residues before they can be used to start a DMC-catalyzed synthesis because bases deactivate DMC catalysts. A conventional KOH polyol unit having refining capability is normally needed just to make a starter polyol that can be used productively with a DMC catalyst. In sum, the process of the invention overcomes this key limitation of the conventional DMC-catalyzed polyol synthesis.

Third, the process of the invention unexpectedly produces polyether polyols that have narrow molecular weight distributions, which are desirable for good polyurethane physical properties. The art generally teaches that continuous addition of starters in a KOH-catalyzed process will produce polyols having very broad molecular weight distributions. I surprisingly found that continuous addition of starter, in the case of a DMC-catalyzed polyol synthesis, gives polyols with narrow molecular weight distributions (see Example 5 and Comparative Example 6)

The process of the invention can be used to produce a wide variety of polyether polyol products. These polyols preferably have number average molecular weights within the range of about 400 to about 30,000, more preferably from about 500 to about 10,000. The polyols have average hydroxyl functionalities within the range of about 1 to about 8, preferably from about 2 to about 3. In addition, the polyols preferably have hydroxyl numbers within the range of about 560 to about 5 mg KOH/g, more preferably from about 280 to about 15 mg KOH/g. The polyols have low unsaturations compared with polyols made using KOH. Preferably, the polyols have unsaturations less than about 0.02 meq/g, more preferably less than about 0.008 meq/g.

The invention includes polyether polyols made by the process of the invention. The polyols are made by continuously adding the epoxide and at least about 2 eq. % of the $S_c$ in a DMC-catalyzed polyol synthesis. These polyols offer surprising and valuable advantages for polyurethane formulation. In particular, the polyols contain a reduced proportion of high molecular weight polyol tail compared with prior DMC-catalyzed polyols.

The amount of high molecular weight polyol tail can be quantified by gel permeation chromatography (GPC) analysis using a light-scattering detector (see Example A). With this technique, we see significantly reduced levels of high molecular weight polyol tail in samples made by the process of the invention. "High molecular weight polyol tail" is the fraction of polyol product that has a number average molecular weight greater than about 100,000 as measured by the GPC technique described in Example A. Addition of even 2 eq. % of the starter continuously during the polymerization gives the benefit.

Generally, the amount of high molecular weight polyol tail in polyol samples made by the process of the invention depends on the product molecular weight; proportionately more high molecular weight tail is present in polyols having higher number average molecular weights. For polymerizations at 130° C. using a typical 6-hour epoxide addition time, the relationship between the amount of high molecular weight polyol tail and the number average molecular weight of the polyol product is approximately given by:

$$y = P_z x^2$$

where y is the amount of high molecular weight polyol tail in ppm, x is the number average molecular weight of the polyol product divided by 1000, and $P_z$ has a value within the range of about 30 to about 40. The approximate amount of tail calculated for an 8000 mol. wt. polyoxypropylene diol, for example would be $35 \times (8000/1000)^2 = (35)(64) = 2240$. This agrees well with an experimentally measured value of about 2000 ppm. As Table 3 shows, faster epoxide addition (more stressed conditions) produces a greater amount of tail.

The amount of high molecular weight polyol tail in a polyol sample can be measured directly by GPC as is described above. Another way to estimate the amount of tail is to evaluate the polyol sample in the "critical foam test." In this test, a polyurethane foam is prepared using a sensitive formulation that is designed to give foam collapse when the level of high molecular weight polyol tail in a sample having a number average molecular weight of about 3000 exceeds about 300 ppm. Details of the foam test appear in Example B. The foam test provides important information about the likelihood of successful and predictable performance in commercial polyurethane foam formulations.

I surprisingly found that polyols having a reduced amount of high molecular weight tail are much easier to formulate into polyurethane systems, especially flexible and molded foams, because they offer more predictable processing and performance. My results show that variability in polyurethane foam performance previously witnessed with DMC-catalyzed polyols is largely due to the presence of even small amounts of high molecular weight polyol tail. Polyols of the invention—particularly those having hydroxyl numbers within the range of about 50 to about 60 mg KOH/g and containing less than about 300 ppm of high molecular weight tail as measured by gel permeation chromatography—offer improved processing characteristics, give fewer problems with tight foam or foam collapse, and give flexible and molded polyurethane foams with excellent physical properties.

The following examples merely illustrate the invention. Those skilled in the art will recognize many variations that are within the spirit of the invention and scope of the claims.

EXAMPLES 1-2

Preparation of Polyether Polyols by DMC Catalysis and Continuous Addition of Starter Zinc hexacyanocobaltate/tert-butyl alcohol complex catalyst (30 mg, prepared as described in Examples 8-11 of copending application Ser. No. 08/435,116) is suspended in enough toluene (200 mL) to reach the stirrer of a one-liter stainless-steel reactor. Propylene oxide containing 1.9 wt. % of propylene glycol (20 g) is added to the reactor, and the mixture is heated at 130° C. to activate the catalyst. (In this example, propylene glycol is the "continuously added starter" or "$S_c$.")

The reactor pressure drops within about 2–3 min., indicating catalyst activation. Additional propylene oxide/ propylene glycol mixture (280 g; 1.9 wt. % propylene glycol) is continuously added to the reactor at 130° C. over 2.5 h. Toluene is removed by vacuum stripping. Additional propylene oxide/propylene glycol mixture (300 g) is continuously added to the reactor at 130° C. over the next 2.5 h. The resulting product is a 4000 mol. wt. diol (hydroxyl number=28 mg KOH/g) having a DMC catalyst level of 50 ppm. Half of this product (300 g) is removed from the reactor and is analyzed (see Example 1, Table 1).

To the remaining 300 g of 4000 mol. wt. diol (containing 50 ppm of active DMC catalyst), additional propylene oxide/propylene glycol mixture (300 g; 1.9 wt. % propylene glycol) is continuously added over 5 h at 130° C. (In this example, propylene glycol is the "$S_c$," while the 4000 mol. wt. diol produced in Example 1 and left in the reactor is the "$S_i$," or "initially charged starter.") The resulting product is a 4000 mol. wt. diol (hydroxyl number=28 mg KOH/g) having a DMC catalyst level of 25 ppm. The diol product is removed and analyzed (see Example 2, Table 1).

EXAMPLES 3-5

Preparation of Polyether Polyols by DMC Catalysis and Continuous Addition of Starter The general method of Examples 1–2 is followed to make an 8000 mol. wt. diol (from water), a 6000 mol. wt. triol (from glycerin), or a 2000 mol. wt. diol (from propylene glycol).

A 300-gram portion of the 8000 mol. wt. diol (hydroxyl number=14 mg KOH/g), which contains 50 ppm of active zinc hexacyanocobaltate catalyst, is used as the $S_i$ (starter initially present) to make another 8000 mol. wt. diol as follows. Propylene oxide (300 g) containing 0.20 wt. % of water is continuously added to the polyol starter/catalyst mixture ($S_i$) over 2 h at 130° C. (Here, the "$S_c$" is water.) The resulting product is an 8000 mol. wt. diol (hydroxyl number=13.5 mg KOH/g) having a DMC catalyst level of 25 ppm. The product is removed and analyzed (Example 3, Table 1).

Similarly, a 300-g portion of the 6000 mol. wt. triol (hydroxyl number=28 mg KOH/g) is used as the $S_i$ for making another 6000 mol. wt. triol. Propylene oxide (300 g) containing 1.5 wt. % of glycerin is continuously added to the $S_i$ over 2 h at 130° C. (Here, the "$S_c$" is glycerin.) The product is a 6000 mol. wt. triol (hydroxyl number=27.7 mg KOH/g) having a DMC catalyst level of 25 ppm (Example 4, Table 1).

A 2000 mol. wt. diol is prepared as described above from 300 g of a 2000 mol. wt. diol containing 50 ppm of active zinc hexacyanocobaltate catalyst (the $S_i$). The continuously added starter, $S_c$, is propylene glycol. Propylene oxide (300 g) containing 3.8 wt. % of propylene glycol is continuously added as described above. The product is a 2000 mol. wt. diol (hydroxyl number=56.2 mg KOH/g) containing 25 ppm of DMC catalyst (Example 5, Table 1).

Figure 2:
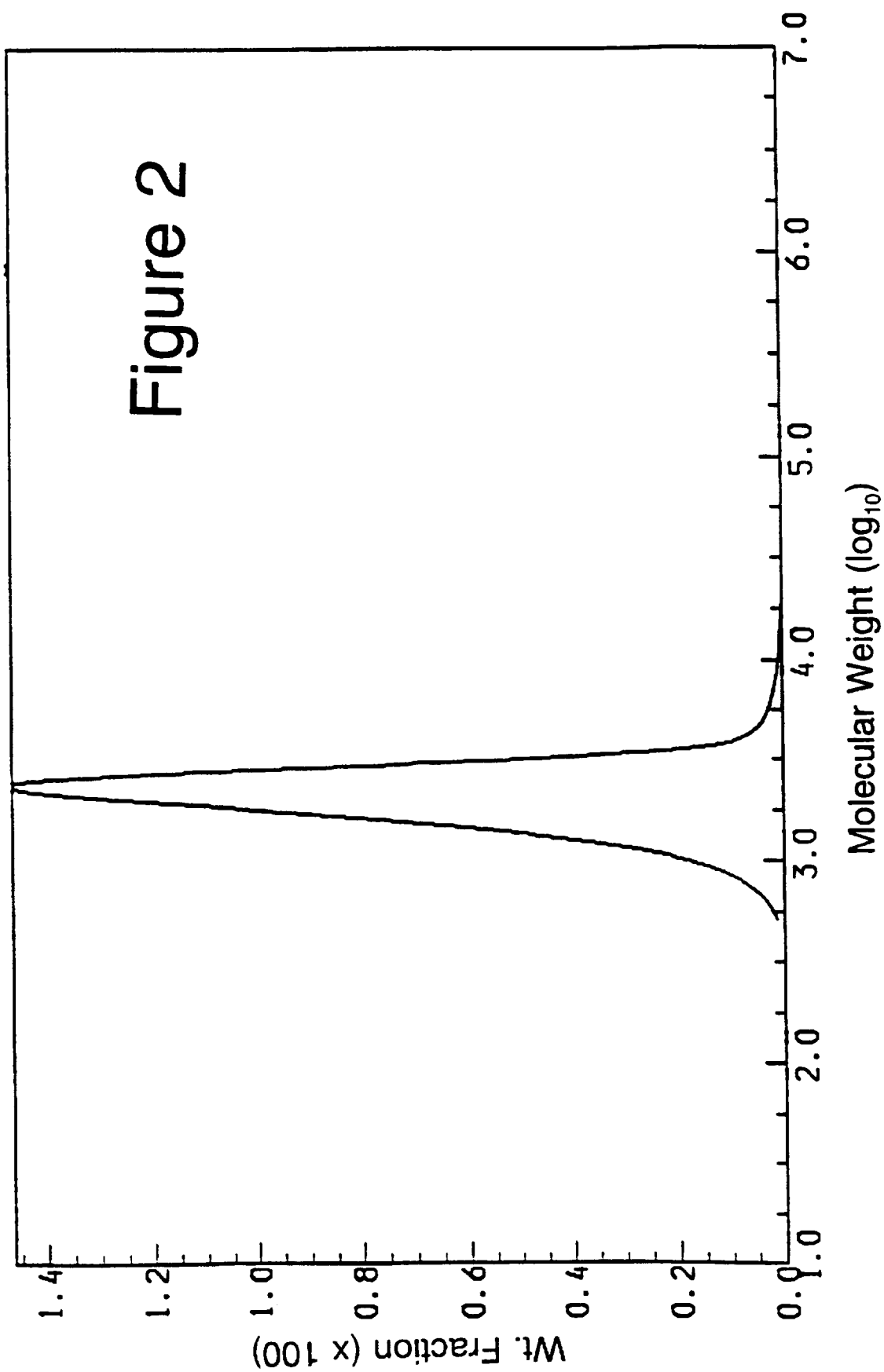

FIG. 2 is a GPC trace of the initially charged 2000 mol. wt. starter ($S_i$). FIG. 3, which is practically identical to FIG.

2, is the GPC trace of the 2000 mol. wt. polyol product made from the 2000 mol. wt. $S_i$.

COMPARATIVE EXAMPLE 6

Effect of Continuous Addition of Starter: KOH Catalysis

This example describes an attempt to prepare a 2000 mol. wt. diol from 300 grams of a 1400 mol. wt. diol containing 2500 ppm of potassium hydroxide catalyst. The 1400 mol. wt. starter is first prepared in conventional fashion by adding propylene oxide to a 425 mol. wt. polyoxypropylene diol using KOH catalysis. The 1400 mol. wt. diol has a hydroxyl number=80 mg KOH/g, Mn=1476; peak mol. wt.=1683, and Mw/Mn=1.11. FIG. 4 shows a GPC trace for the 1400 mol. wt. diol starter.

As in Example 5, the continuously added starter, $S_c$, is propylene glycol. Propylene oxide (300 g) containing 3.8 wt. % of propylene glycol is continuously added to the KOH/1400 mol. wt. polyol mixture over 4 h. The product is a 2000 mol. wt. diol (hydroxyl number=64.2 mg KOH/g). See Comparative Example 6, Table 1. FIG. 5 shows a GPC trace for the 2000 mol. wt. diol product.

As FIGS. 4 and 5 amply demonstrate, continuous addition of starter in the case of a KOH-catalyzed process generates a multi-disperse product having a broad molecular weight distribution. A skilled person would expect similar results from a DMC-catalyzed process that uses continuous addition of starter. Surprisingly, however, continuous addition of propylene glycol to the $S_i$ over the course of the DMC-catalyzed polymerization produces a monodisperse product. (Compare FIGS. 4 and 5 with FIGS. 2 and 3.)

EXAMPLE 7

Heel Process for Making Polyether Diol Using Continuous Addition of Starter

A 4000 mol. wt. polyoxypropylene diol is made in a conventional manner from zinc hexacyanocobaltate/tert-butyl alcohol complex catalyst, propylene oxide, and a 725 mol. wt. polyether diol starter (hydroxyl number=155 mg KOH/g). The polyether diol starter is a purified product made from propylene glycol and propylene oxide by KOH catalysis. Addition of propylene oxide over 3.3 h at 130° C. to the 725 mol. wt. diol and DMC catalyst gives a 4000 mol. wt. diol containing 125 ppm of DMC catalyst. It has hydroxyl number=30 mg KOH/g; unsaturation=0.0049 meq/g; Mw=3960; Mn=3700; and Mw/Mn=1.07.

The reactor is drained to remove about 80% of the product. The remaining 4000 mol. wt. diol (the "heel," about 150 g) is used as the starter ($S_i$) for another polymerization run. Propylene oxide (600 g) containing 1.8 wt. % of propylene glycol is continuously added to the 4000 mol. wt. diol heel over 5 h at 130° C. Here, the $S_c$ is propylene glycol. The resulting product is a 4000 mol. wt. diol containing 25 ppm of DMC catalyst. It has hydroxyl number=29 mg KOH/g; unsaturation=0.0049 meq/g; Mw=4600; Mn=3930; and Mw/Mn=1.17.

EXAMPLES 8–10

Effect of Continuous Addition of 5–22% of the Starter (Water)

An 8000 mol. wt. polyoxypropylene diol is prepared from a 2000 mol. wt. polyoxypropylene diol charged initially ($S_i$) and propylene oxide containing various amounts of water as follows.

A one-liter stainless-steel reactor is charged with zinc hexacyanocobaltate/tert-butyl alcohol complex (0.015 g, 25 ppm in the finished polyol) and 2000 mol. wt. polyoxypropylene diol (the $S_i$) (PPG-2025 diol, amount used shown in Table 2). Propylene oxide containing water (the $S_c$) in various amounts (from 125 to 500 ppm, see Table 2) (20 g) is added to the reactor, and the mixture is heated at 130° C. to activate the catalyst. After pressure drop occurs (about 5–10 min.), the remaining propylene oxide/water mixture is added to the reactor over 1 h. (This is a very rapid addition of propylene oxide compared with a typical commercial process, and is expected to result in products having relatively broad molecular weight distributions). The water in the propylene oxide represents from 5.5 to 22% of the total starter used. The product in each case is an 8000 mol. wt. polyoxypropylene diol (see Examples 8–10, Table 2).

COMPARATIVE EXAMPLE 11

No Starter Continuously Added

The procedure of Examples 8–10 is followed, except that the propylene oxide used contains no added water. Thus, the only starter present is the 2000 mol. wt. polyoxypropylene diol charged initially (the $S_i$). The propylene oxide is added over 1 h as described above, and the resulting 8000 mol. wt. diol is isolated and characterized (see Comparative Example 11, Table 2).

The results of Examples 8–10 and Comparative Example 11 demonstrate the surprising and valuable advantages of continuously adding from 5.5 to 22% of the starter in the form of water. Continuous addition of water results in 8000 mol. wt. polyoxypropylene diol products having substantially narrower molecular weight distributions and dramatically reduced viscosities (see Table 2).

EXAMPLES 12–15

Effect of Continuous Addition of 2–9% of the Starter

The procedure of Examples 8–10 is generally followed on a 10-gallon scale to prepare polyols useful in making flexible slabstock polyurethane foams (triols, all secondary hydroxyl end groups, hydroxyl number=52 mg KOH/g).

The starter present initially, $S_i$, is LHT-240 triol (glycerin/propylene oxide adduct, hydroxyl number=240 mg KOH/g). The catalyst is zinc hexacyanocobaltate/tert-butyl alcohol complex used at a level of 25 ppm in the finished polyol. Following activation of the catalyst at 130° C., a mixed feed of propylene oxide and ethylene oxide (about 20 wt. % EO) is added over about 4 h at 130° C. until a hydroxyl number of about 69 mg KOH/g is reached. A 25% endcap of propylene oxide is introduced at the end of the polymerization, which is added over 2 h at 130° C. In Examples 12 and 13, water (200–500 ppm) is included in the mixed PO/EO feed and also in the 25% propylene oxide used as an endcap. In Examples 14 and 15, propylene glycol (2000 ppm) is added concurrently with the PO/EO feed and PO endcap, but as a separate stream. The added water or propylene glycol represents from 2 to 9% of the total amount of starter used. The total feed time for the epoxides is 3–6 h. The resulting polyether triols have hydroxyl numbers of about 52 mg KOH/g (see Table 3). These products are actually triol/diol mixtures, since addition of propylene oxide to water or propylene glycol results in an increased diol content of these material.

Each of these polyol samples passes the "critical foam test" described in Example A (below). A "pass" in the foam test suggests that the polyol sample contains less than about 300 ppm of high mol. wt. polyol tail. i.e., polyol that has a number average mol. wt. greater than about 100,000 as measured by gel permeation chromatography (GPC). For each sample, the amount of high mol. wt. polyol tail is also estimated from the GPC analysis.

COMPARATIVE EXAMPLES 16 and 17

No Starter Continuously Added

The procedure of Examples 12–15 is followed, except that the 25% of propylene oxide added as an endcap contains no water or propylene glycol. The products are polyether triols having hydroxyl numbers of about 52 mg KOH/g.

Both of these samples fail the "critical foam test" of Example A. This result suggests that the polyols contain more than about 300 ppm of high molecular weight polyol tail. The GPC results confirm that more than about 200 ppm of high molecular weight polyol tail is present (see Table 3).

EXAMPLE 18

Preparation of a 4000 Mol. Wt. Diol by Continuous Addition of Water

In this example, a 4000 mol. wt. polyoxypropylene diol is prepared using water as the $S_c$ and PPG-725 diol as the $S_i$. The water represents 33% of the total amount of starter used.

The reactor is charged with PPG-725 diol (150 g) and zinc hexacyanocobaltate/tert-butyl alcohol complex (0.030 g, prepared as described in Examples 8–11 of copending application Ser. No. 08/435,116). The catalyst is activated at 130° C. with pure propylene oxide (22 g). The pressure in the reactor drops from 21 psig to −12 psig within 15 min., signalling catalyst activation. Propylene oxide containing water (1500 ppm, 0.15 wt %) is then added at 3 g/min. until a total of 450 g have been added.

Half of the polyol product is drained from the reactor (about 300 g), and an additional 300 g of propylene oxide containing 1500 ppm of water is added. The resulting polyether polyol has hydroxyl number=26 mg KOH/g, unsaturation=0.047 meq/g, Mn=4272, Mw=4478, Mpeak= 4278, and Mw/Mn=1.048. FIG. 1 shows the GPC trace obtained for this product.

EXAMPLE 19

Preparation of PPG-725 Diol by Continuous Addition

This example shows how to prepare PPG-725 diol by continuous addition of propylene oxide containing 10 wt. % of propylene glycol.

The reactor is charged with PPG-425 diol (425 mol. wt. polyoxypropylene diol, 150 g) and zinc hexacyanocobaltate/ tert-butyl alcohol catalyst (0.075 g, prepared as described in Examples 8–11 of copending application Ser. No. 08/435, 116). The catalyst is activated with pure propylene oxide (23 g). Within 26 min., the reactor pressure drops, and more propylene oxide (105 g) is added. At this point, the expected molecular weight of the product is about 725 g/mole. The feed is changed from pure propylene oxide to a mixture of propylene glycol (10 wt. %) in propylene oxide. This mixture (495 g) is added at 4 g/min. The total time for epoxide addition is about 2 h. The product is a 725 mol. wt. polyoxypropylene diol that contains about 100 ppm of active DMC catalyst.

The PPG-725 diol is then used as a starter to make a 2900 mol. wt. polyoxypropylene diol the "conventional way" by adding pure propylene oxide (450 g) to 150 g of PPG-725 diol at 4 g/min.

EXAMPLE A

Gel Permeation Chromatography (GPC) Technique

Polyether polyol samples are analyzed by gel permeation chromatography using unstabilized tetrahydrofuran (available from Burdick and Jackson) as an elution solvent (flow rate=1 mL/min). The instrument consists of a Hitachi isocratic high-pressure pump, a Hitachi auto-sampler injection system (or manual valve injector), a single PLgel 5 μm MIXED-D 300×7.5 mm column (available from Polymer Laboratories), and a Sedex evaporative light scattering detector (from Richard Scientific). An electrically actuated Valco switching valve is used to limit the amount of sample reaching the detector.

The instrument is calibrated to determine the elution time for a nominal 100,000 molecular weight polystyrene standard sample (available from Polymer Laboratories). Polyol samples are prepared by dissolving 1% by weight polyol in tetrahydrofuran. The samples are filtered through a 0.2 μm syringe filter and 250 μl injections are made onto the chromatographic column. During a run, chromatographic effluent is allowed to pass to the detector until one half minute past the elution time for a standard 100,000 mol. wt. polystyrene sample is reached (about 6 min). At that time, the rest of the sample (most of the lower molecular weight material) is diverted away from the detector to a waste stream. Sample flow to the detector resumes toward the end of the run to re-establish a baseline.

The area of high molecular weight polyol tail (i.e., polyol eluting up to the elution volume of the 100,000 molecular weight polystyrene standard) in the sample is determined by electronic integration. Concentrations of high molecular weight tail are calculated using the high molecular weight tail area, the areas for known concentration polystyrene standards, and a log peak area vs. log concentration calibration curve. Reported values are an average of two separate measurements for the same polyol sample.

EXAMPLE B

Critical Foam Test

Conventional one-shot flexible polyurethane foams are hand mixed and poured using the following "stressed" formulation. The formulation is characterized as stressed because it is intentionally made sensitive to the presence of high molecular weight polyol tail. If the level of tail is greater than about 200 ppm, foam collapse is generally observed.

The B-side is prepared from the polyol sample to be analyzed (100 parts, typically a 3000 mol. wt. polyether triol), water (6.5 parts), dichloromethane (15 parts), A-1 catalyst (product of Air Products, 0.1 parts), T-9 catalyst (product of Air Products, 0.25 parts), and L-550 surfactant (product of Dow Corning, 0.5 parts). Toluene diisocyanate (78.01 parts, 110 NCO/OH index) is rapidly added to the B-side components, the ingredients are mixed well and poured into a cake box. The foam rises and cures, and the % settling (or collapse) is noted.

The preceding examples are meant only as illustrations; the following claims define the scope of the invention.

TABLE 1

Preparation of Polyether Polyols using a DMC Catalyst and Continuous Addition of the Starter

| Ex # | Starter charged initially (S$_i$) | Starter continuously added (S$_c$) | Conc. of Sc in PO (wt. %) | Catalyst | Cat. level (ppm) | OH # | Unsat. | Visc. | Peak MW | Mn | Mw/Mn |
|---|---|---|---|---|---|---|---|---|---|---|---|
| 1 | None (toluene) | propylene glycol | 1.9 | Zn—Co "A" | 50 | 28.2 | 0.007 | 997 | 3080 | 2800 | 1.22 |
| 2 | 4k diol | propylene glycol | 1.9 | Zn—Co "A" | 25 | 28.3 | 0.007 | 1040 | 3040 | 2750 | 1.21 |
| 3 | 8K diol | water | 0.20 | Zn—Co "B" | 25 | 13.5 | 0.007 | 3790 | 9400 | 8130 | 1.22 |
| 4 | 6K triol | glycerin | 1.5 | Zn—Co "A" | 25 | 27.7 | 0.007 | 2210 | 4760 | 5070 | 1.26 |
| 5 | 2K diol | propylene glycol | 3.8 | Zn—Co "A" | 25 | 56.2 | 0.007 | 380 | 2340 | 1880 | 1.16 |
| C6 | 1.4K diol | propylene glycol | 3.8 | KOH | 2500 | 64.2 | 0.052 | — | 3300, 1830, 1030 | 1790 | 1.31 |

Zn—Co "A" is zinc hexacyanocobaltate/tert-butyl alcohol complex catalyst, powder, prepared as described in Examples 8–11 of copending Appl. Ser. No. 08/435,116.
Zn—Co "B" is zinc hexacyanocobaltate/tert-butyl alcohol/polyether polyol complex catalyst prepared as described in U.S. Pat. No. 5,482,908.
The PO/starter mixture is continuously added over 2–5 h (see Examples).

TABLE 2

Continuous Addition of Starter: Effect of Amount of Added Water on Polyol Properties

| Ex # | Starter charged initially (S$_i$) | Starter continuously added (S$_c$) | Conc. of Sc in PO (ppm) | Catalyst | Cat. level (ppm) | OH # | Unsat. | Visc. | Peak MW | Mn | Mw/Mn |
|---|---|---|---|---|---|---|---|---|---|---|---|
| 8 | 2K diol | water | 500 | Zn—Co "A" | 25 | 12.0 | 0.009 | 4090 | 4940 | 5790 | 1.51 |
| 9 | 2K diol | water | 250 | Zn—Co "A" | 25 | 15.1 | 0.010 | 4500 | 4910 | 5890 | 1.59 |
| 10 | 2K diol | water | 125 | Zn—Co "A" | 25 | 14.1 | 0.010 | 5000 | 4760 | 5860 | 1.73 |
| C11 | 2K diol | none | 0 | Zn—Co "A" | 25 | 14.4 | 0.011 | 9260 | 4150 | 5640 | 2.17 |

Zn—Co "A" is zinc hexacyanocobaltate/tert-butyl alcohol complex catalyst, powder, prepared as described in Examples 8–11 of copending Appl. Ser. No. 08/435,116.
The PO/starter mixture is continuously added over 1 h.

I claim:

1. A process which comprises making a polyether polyol by polymerizing an epoxide in the presence of:
   (a) a double metal cyanide (DMC) catalyst;
   (b) a continuously added starter (S$_c$); and
   (c) optionally, an initially charged starter (S$_i$);
   wherein the S$_c$ comprises at least about 2 eq. % of the total starter used; and
   wherein the epoxide and the S$_c$ are continuously added to the reactor during the polymerization.

2. The process of claim 1 wherein the resulting polyether polyol contains a reduced amount of high molecular weight polyol tail compared with a polyether polyol made without continuous addition of starter.

3. The process of claim 1 wherein the epoxide is selected from the group consisting of ethylene oxide, propylene oxide, butylene oxides, and mixtures thereof.

4. The process of claim 1 wherein the DMC catalyst is a zinc hexacyanocobaltate catalyst.

5. The process of claim 4 wherein the DMC catalyst is a zinc hexacyanocobaltate/tert-butyl alcohol complex.

6. The process of claim 1 wherein the S$_c$ is selected from the group consisting of water and low molecular weight polyols.

7. The process of claim 6 wherein the S$_c$ is a low molecular weight polyol selected from the group consisting of glycerin, trimethylolpropane, propylene glycol, dipropylene glycol, and tripropylene glycol.

8. The process of claim 1 wherein the S$_c$ comprises from about 2 to about 10% of the total starter, and the resulting polyether polyol contains a reduced amount of high molecular weight polyol tail compared with a polyether polyol made without continuous addition of starter.

9. The process of claim 1 wherein the S$_i$ comprises a polyol intermediate having an average hydroxyl functionality from about 2 to about 8, a hydroxyl number within the range of about 28 to about 560 mg KOH/g, and a number average molecular weight within the range of about 400 to about 4000.

10. The process of claim 1 wherein the S$_i$ comprises a heel of polyether polyol made in a prior polymerization.

11. A process which comprises making a polyether polyol by polymerizing an epoxide in the presence of:
   (a) a zinc hexacyanocobaltate/tert-butyl alcohol complex catalyst;

(b) a continuously added starter ($S_c$); and (c) optionally, an initially charged starter ($S_i$);

wherein the $S_c$ comprises at least about 2 eq. % of the total starter used;

wherein the epoxide and the $S_c$ are continuously added to the reactor during the polymerization; and wherein the resulting polyether polyol contains a reduced amount of high molecular weight polyol tail compared with a polyether polyol made without continuous addition of starter.

12. The process of claim 11 wherein the epoxide is selected from the group consisting of ethylene oxide, propylene oxide, butylene oxides, and mixtures thereof.

13. The process of claim 11 wherein the $S_c$ is selected from the group consisting of water and low molecular weight polyols.

14. The process of claim 11 wherein the $S_1$ comprises a heel of polyether polyol made in a prior polymerization.

15. A polyether polyol made by the process of claim 1.

16. A polyether polyol made by the process of claim 5.

17. A polyether polyol made by the process of claim 11.

18. A polyether polyol made by DMC catalysis which comprises an amount of high molecular weight tail less than about y ppm, where $y=P_z x^2$ in which x is the number average molecular weight of the polyether polyol divided by 1000, and $P_z$ has a value within the range of about 30 to about 40, wherein the tail has a number average molecular weight greater than about 100,000 as measured by gel permeation chromatography using an evaporative light scattering detector and polystyrene standards.

19. The polyether polyol of claim 18 having a hydroxyl number within the range of about 50 to about 60 mg KOH/g and comprising less than about 300 ppm of high molecular weight polyol tail.

* * * * *